United States Patent [19]

Le Corre et al.

[11] Patent Number: 5,555,307
[45] Date of Patent: Sep. 10, 1996

[54] DEVICE AND PROCESS FOR RENDERING SECURE THE TRANSMISSION OF FAXES, AS WELL AS FAX UNIT WHICH HAS BEEN MADE SECURE AND INCORPORATING SUCH A DEVICE

[75] Inventors: Hervé Le Corre, Everville; Marc Girault, Caen; Marie-Joséphe Revillet, Verson, all of France

[73] Assignee: France Telecom Establissement Autonome De Droit Public, Paris, France

[21] Appl. No.: 188,052

[22] Filed: Jan. 26, 1994

[30] Foreign Application Priority Data

Jan. 28, 1993 [FR] France ................... 93 00867

[51] Int. Cl.⁶ ........................................... H04L 9/00
[52] U.S. Cl. ................. 380/18; 380/25; 380/30
[58] Field of Search ................. 380/18, 25, 30; 340/825.34; 358/468

[56] References Cited

U.S. PATENT DOCUMENTS

| | | | |
|---|---|---|---|
| 4,064,389 | 12/1977 | Patterson | 340/825.34 |
| 4,926,325 | 5/1990 | Benton et al. | |
| 4,926,478 | 5/1990 | Gruenberg | 380/25 |
| 5,337,362 | 8/1994 | Germish et al. | 380/30 |
| 5,438,433 | 8/1995 | Reifman et al. | 358/468 |

FOREIGN PATENT DOCUMENTS

| | | |
|---|---|---|
| 0516898 | 12/1992 | European Pat. Off. |
| 2217949 | 3/1989 | United Kingdom |
| 9209161 | 5/1992 | WIPO |

OTHER PUBLICATIONS

French Search Report–FR 9300867–FA 485033–Sep. 15, 1993.

*Primary Examiner*—Salvatore Cangialosi
*Attorney, Agent, or Firm*—Pearne, Gordon, McCoy & Granger

[57] ABSTRACT

Device and process for securing the transmission of telecopies or faxes and a secured telecopier or fax unit having such a security device. The device incorporating a user interface (16) permitting the establishment of a dialogue therewith and a security module (17) permitting the production and checking of digital signatures and preventing replay. The invention also relates to a fax unit including such a device and to a process for securing the transmission of faxes.

9 Claims, 2 Drawing Sheets

DEVICE AND PROCESS FOR RENDERING SECURE THE TRANSMISSION OF FAXES, AS WELL AS FAX UNIT WHICH HAS BEEN MADE SECURE AND INCORPORATING SUCH A DEVICE

FIELD OF THE INVENTION

The present invention relates to a device and to a process for making secure the transmission of telecopies or faxes and to a telecopier or fax unit having such a device.

DESCRIPTION OF RELATED ART

The great advantages of faxing are the ease of use, the use of the public telephone system and direct transmission. However, its weak point is security. The latter point makes it impossible to give a legal status to a document transmitted by fax.

Thus, the security levels offered by the prior art fax units are inadequate and inappropriate for the requirements of certain users. There are numerous fax security requirements such as confidentiality, authentification, integrity, non-repudiation and replay detection.

The presently available fax units offer no real assurance of integrities and deterioration can occur as a result of transmission incidents, scanning, printing or deliberate falsification acts.

Encrypting equipment has been developed by a number of designers in order to remedy this lack of security, but such equipment is only based on encrypting and does not permit a widespread use within an open group of subscribers. They also require the prior exchange of keys.

Therefore, one object of the present invention is to give an adequate security level to faxing on the switched public telephone network, in order to meet the needs of users with regard to security and permit the legal recognition of fax transmissions.

SUMMARY OF THE INVENTION

The invention relates to a device for rendering secure the transmission of faxes, the device comprising a user interface permitting dialogue with the user, and a security module permitting the production and checking of digital signatures. The security module advantageously has a smart card reader for each user and, optionally, an encrypting and decrypting module, which only exists in the case where the transmitter has a need for confidentiality in the connection mode.

The invention also relates to a new generation of so-called secured fax units, incorporating such an internal security device.

The invention also relates to a process for rendering secure or securing the transmission of faxes comprising the steps of: preparing the transmitting fax unit involving the authentification of the operator with the security module and the choice of the transmission mode; transmitting the document to be faxed comprising the transmission of different pages of the document to be faxed, with the transmission of so-called "security" informations, checking and storage of the acknowledgement of receipt received from the receiver terminal; and, optionally, a consultation stage.

Advantageously, the "security" informations are transmitted in a supplementary, so-called "security" page.

Advantageously the invention makes possible the following results:

for the transmitting user:
reception of an acknowledgement of receipt, so as to be certain that the receiving fax unit has indeed received the document,
avoiding a repudiation on reception, so as to be able to subsequently prove that the document was indeed sent;

for the receiving user:
permitting an authentification of the transmitter, so as to be certain of his identity,
avoiding a repudiation on transmission, so as to be able to subsequently prove that he has indeed received the document;

for both the transmitting and receiving fax units:
obtaining confidentiality, so as to ensure that no unauthorized person can acquire knowledge of the transmitted informations,
obtaining integrity so as to ensure that the transmitted informations cannot be modified without the recipient noticing,
avoiding any replay, so that it is impossible to carry out an identical communication in place of the transmitter.

DETAILED DESCRIPTION OF THE PREFERRED EMBODIMENTS

Figure 1:
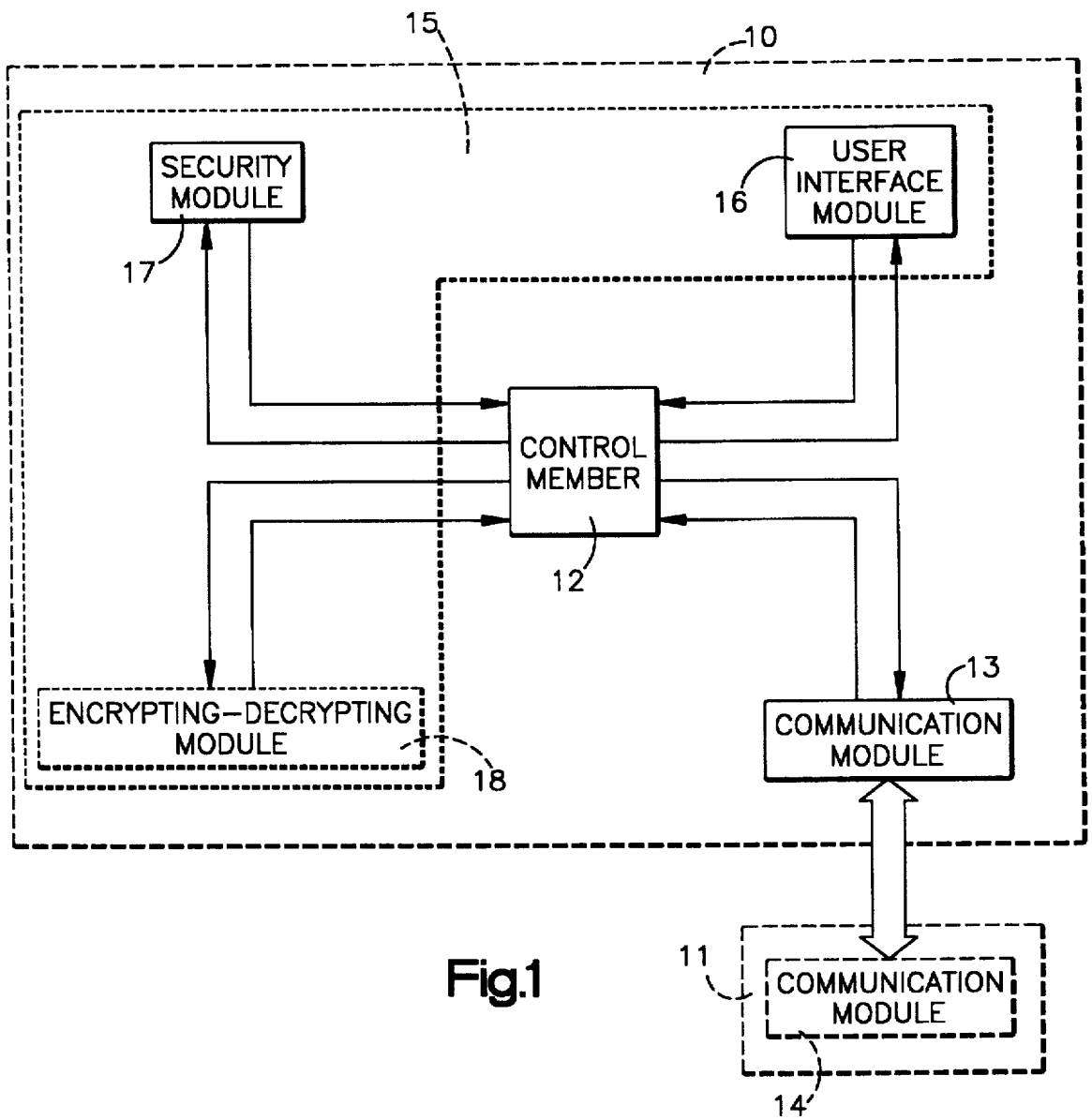
FIG. 1 illustrates a fax unit incorporating the security device according to the present invention.

FIG. 1 illustrates the link between first and second transmitting and receiving fax units 10,11. The first fax unit 10 comprises a checking or control member 12 having a bulk memory and a communication module 13, which can communicate with the communication module 14 of the second fax unit 11. According to the invention, the first fax unit 10 (and optionally the fax unit 11) also comprises a security device 15. The security device comprises a user interface module 16 permitting a dialogue therewith, as well as a security module 17 permitting the production and checking of digital signatures and the combatting of replay and which can advantageously have a smart card reader able to read such a card, which is individual to each user or group of users.

The security device 15 can also comprise an encrypting-decrypting module 18, which only exists when the two fax units 10 and 11 have a need for confidentiality in the transmission mode. In this case, the second fax unit 11 must also have the said module, together with the security module.

The security device 15 can be an autonomous device for completing a conventional fax unit, or can be an internal device forming part of a fax unit belonging to a new generation of so-called secured fax units.

Figure 2:
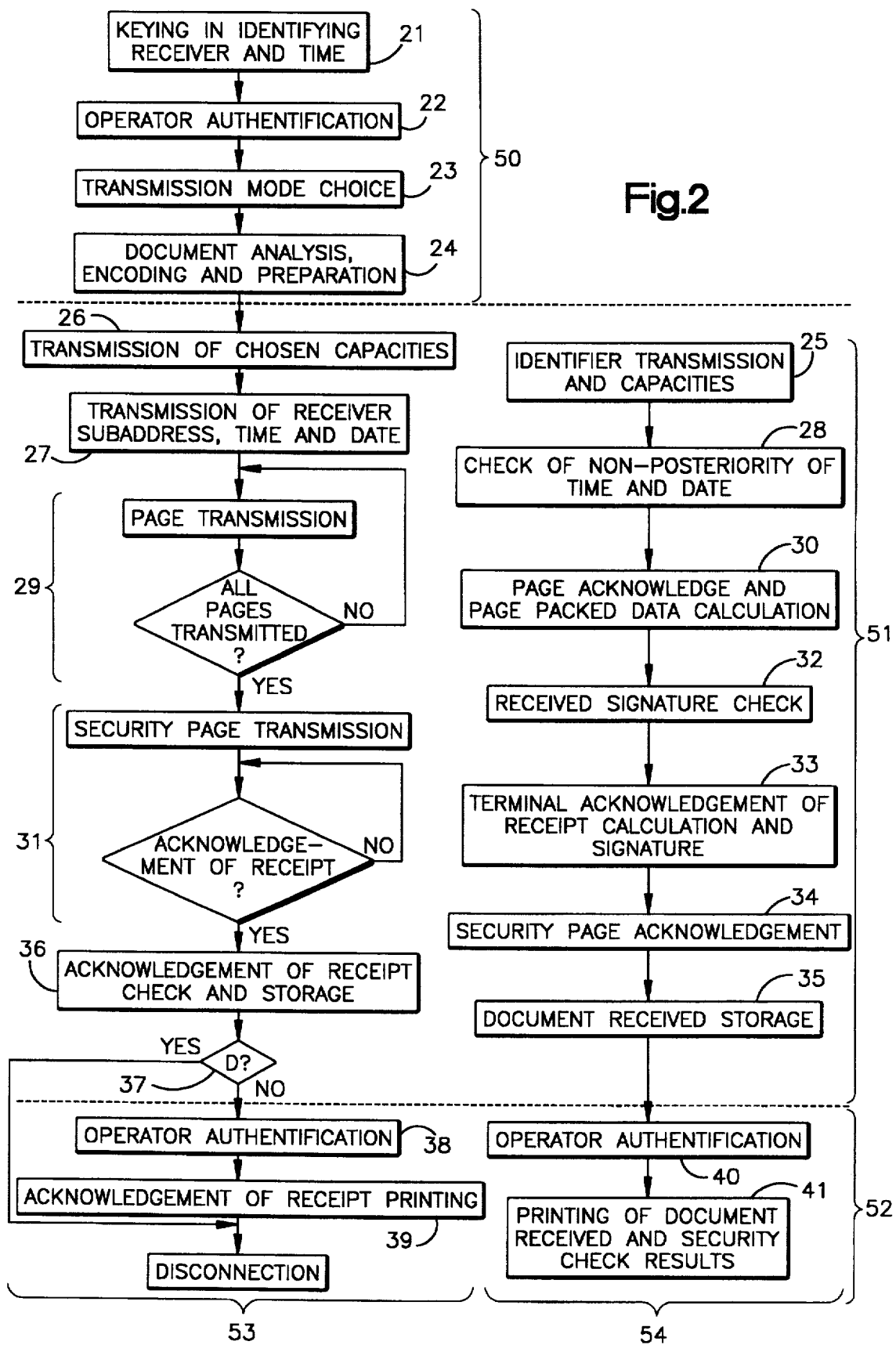
FIG. 2 is a flow chart diagrammatically illustrating the fax transmission process according to the present invention.

The invention also relates to a process for secured point to point transmission of faxes. As shown in FIG. 2 with regard to both a transmitter side 53 and a receiver side 54, such a process comprises a stage 50 of preparing the transmitting fax unit, a transmission stage 51 and a consultation stage 52.

After putting into place the document to be transmitted on the tray of the transmitting fax unit, or the optional selection of a document already stored in the memory of said fax unit, during the stage 50 of preparing the transmitting fax unit:

the identifier of the recipient is keyed in (phase 21) or is consulted on an electronic directory and the transmission time is keyed in and this can either be immediate or deferred;

optionally authentification takes place of the operation with the security module by inserting its smart card and the keying in of its secret code (phase 22);

if this authentification has been correctly carried out, the transmission mode is chosen (phase 23), i.e.:

either the standard (unsecured) mode, which is the transmission mode of prior art fax units, or the secured mode making it possible to comply with the requirements of integrity, non-repudiation and authentification, as defined hereinbefore, or the encrypted mode, which makes it possible to meet the requirements of the secured mode, as well as a confidentiality requirement by establishing that a mode change is authorized;

analysis or scanning takes place and the document is encoded, which makes it possible to reduce its volume. The document is prepared on a security basis with the calculation of packed data, calculation and storage of signatures, optional encrypting if this is required and the generation of a security page (phase 24) This security page generation can be replaced by the transmission of security information on one or all the pages of the document in question.

The dialogue with the operator is then finished. A message is transmitted and the operator can then remove his smart card.

The transmission stage 51 can then start either immediately or in deferred form, with the automatic establishment of communication. If there is a transmission on either side of the identifier (CSI) of the terminal and his capacities (two bits for security: securized, encrypting in frame DIS) (phases 25 and 26). Then, on the transmitting fax unit side, during the said stage 51:

transmission takes place of the subaddress of the receiving fax unit, as well as the date and time of signature of the first page in the frame provided for the password (phase 27). The receiving terminal can then check the non-posteriority of the date and time (phase 28). If agreement does not exist, the receiving terminal is disconnected;

each page of the document is transmitted (phase 29), optionally containing security informations.

The receiving terminal successively acknowledges each page and calculates the packed data of each page received (phase 30).

The transmitting terminal optionally transmits the so-called security page and awaits an acknowledgement of receipt (phase 31).

The receiving terminal carries out a checking stage:

it checks the signatures received on the basis of previously calculated packed data (phase 32), it calculates and signs the "terminal" acknowledgement of receipt (phase 33), it acknowledges the security page or security informations and attaches the "terminal" acknowlegement of receipt (phase 34), it stores the document received in a protected directory (phase 35).

After checking and storing the acknowledgement of receipt (phase 36), the receiving terminal can then be disconnected.

During the immediate or deferred consultation stage 52:

from the side of the transmitting terminal (test 37: disconnection D?), there is:

authentification of the operator with the security module (with the optional insertion of the smart card and keying in of the secret code) (phase 38), printing (or consultation) of the terminal acknowledgement of receipt (phase 39), from the side of the receiving terminal, there is:

authentification of the operator with the security module (with optional insertion of the smart card and keying in of the secret code) (phase 40), printing (or consultation) of the document received and the results of secure checks (phase 41).

Thus, the aim of the invention is that any fax unit can receive faxes having a minimum security level. However, in order to be able to transmit secured faxes, the transmitting fax units must belong to a new generation, or must use the aforementioned securing device placed on the telephone line. Hereinafter the term "secured fax unit" will be used to describe either a new generation terminal, or a conventional terminal supplemented by the securing device according to the invention inter alia generating the error correction mode.

Secured fax units have the error correction mode of the protocol "of procedures for the transmission by fax of documents in the public connected telephone network" called T30, as recommended by CCITT with a possibility of interpreting pages in the character mode. They also have a security module 17.

For multiuser terminals, the security module 17 is constituted by a smart card reader able to read a smart card individual to each user. In the case of a monouser terminal, or a terminal which is physically protected, the security module is integrated into the fax unit.

In both cases, this security module 17 makes it possible to sign and optionally generate a session key for an optional encrypting of the documents to be transmitted. The actual encrypting takes place in the fax unit by the encrypting and decrypting module 18.

No supplementary frame is necessary in the T30 protocol, but certain arrangements must be made. Inter alia, an acknowledgement of receipt must be generated by the receiving terminal in order to complete the message confirmation signal, called MCF in said protocol. Each person using same in the secured mode must have his own code or identifier, which is transmitted in the protocol.

The basic mechanisms chosen in the invention to satisfy these security needs are consequently the digital signature and encrypting. Encrypting is only used in the case where the transmitter has a need for confidentiality in the connection mode. However, the use of these mechanisms requires the transmission of security informations. These informations are advantageously transmitted in the supplementary, so-called security page added to the document and generated by the transmitting fax unit.

Each information transmitted as a header of the security page is digitally signed, the signatures appearing on the security page. These informations are the identifiers of the transmitting and receiving persons, the random variable making it possible to generate the signatures, the date and time of the start of the transmission of the document, the number of transmitted pages (not including the security page). The body of the page contains the number followed by the signature of each page of the document transmitted in the secured mode (not including the security page).

The security page is transmitted either in the character mode, or in graphic format (i.e. encoded in one of the image encoding modes suitable for faxing) if the fax unit of the recipient does not have the capacities necessary for the interpretation of the character mode of the security page. When the security page is received, in the character mode, the securized receiving fax unit regenerates the page in the graphic mode, so that the user can keep a paper copy thereof.

The bitmap is a file, which can be obtained by scanning a document. This file is different for each scan of the same document. For the signature thereof, it is proposed that this coded file be digitally signed in one of the modes recommended for faxing. The recipient must check the signatures on reception and store the document for any subsequent check.

The user wishing to transmit a secured fax must insert his smart card containing his secret keys, so that it calculates the signatures and generates a session key, if the need arises. On a secured fax unit, if the smart card of the recipient is inserted at the time of reception, decrypting takes place in line. If not, the document is stored in the encrypted form in the letterbox thereof and is decrypted at the time of consultation.

In the case of transmission to a secured fax unit, the receiving fax unit checks that the date and time of the transmitted document is not subsequent to its own date (to within an epsilon), if not the receiver disconnects the communication. The date and time refers to the date and time of signature of the first page of the transmitted document. In the case of international communications, GMT must be used.

The term session key means the sequence of bits used for generating the pseudorandom sequence used for encrypting the encoded bitmap file. The pseudorandom sequence must be the same for the transmitter and the receiver. The session key is generated by an algorithm based on identity which, without any exchange, makes it possible to calculate a secret held by the two corresponding parties and then alone.

Each entity (transmitter A or receiver B) wishing to use the encrypting/decrypting functions has a secret key S generated by an authority, on the basis of his identifier I. No user has knowledge of the secret key and it is stored in his personal security module (e.g. smart card) and is only accessible to the authority which has generated it.

A key $K_{AB}=g(S_A,I_B)=g(S_B,I_A)$ is used for generating a session key. The key $K_{AB}$ is diversified by a random variable (e.g. the time and date) in order to generate a session key K: $K=f(K_{AB}$, random variable).

For a communication, the transmitter A and the receiver B consequently have a common key, which only they can generate, because they are the sole possessors of one of the secret keys $S_A$ or $S_B$. The parameters to be transmitted are the random variable and the identity of the transmitter.

There is no particular constraint regarding the signature, because the signatory has the chance to easily transmit security informations. The signature of each of the pages must reveal secret elements stored in the smart card of the user, together with a random variable (e.g. the date and time), together with the page number.

The secret elements or keys of each user are stored in his smart card. Each card essentially has three secret elements:

the first element is a confidential code enabling the card to authenticate its legitimate owner;

the second element ($S_A$ hereinbefore) enables the card of the transmitter to calculate a common session key with the card of the receiver, said session key being used for encrypting the document;

the third element makes it possible for the card of the transmitter to calculate a digital signature, which can be verified by any other card appropriate for the invention.

Apart from these secret elements, the card must contain the identifier of the user.

Each of the following security services is based on the signature mechanism (signature verification) applied to different data:

The integrity is based on the signature. It is performed for each page. All the signatures are transmitted on the security page at the end of the document. The signature of a page relates to its content, its number and the random variable.

Replay is a fraud consisting of retransmitting, sometimes without the knowledge of the true transmitter, a document to the same receiver without the latter being aware of it. On reception, the secured fax units store the times of the signature and the identifiers of the transmitters of communications which have taken place in the last forty eight hours. The receiving fax unit must clamp on the receiver if the variation between the time and date of transmission exceeds forty eight hours and if the same time and date for the same transmitter has already been recorded during the last forty eight hours.

The time and date signed by the transmitter is transmitted in the security page and is also transmitted in unsigned form at the start of the protocol in the PWD (password) frame of the T30 protocol.

The receiver authenticates the transmitter checking the signature of the identifier of the transmitter transmitted in the security page.

To obtain protection against a dishonest transmitter disputing the content of a document, the receiver must retain in electronic form the document received and associated with the signature. This function imposes electronic storage capacities on the part of the receiver. The conformity of the signature with the document presented and the identity of the transmitter enables a judge to authenticate the document.

To obtain protection against a dishonest receiver disputing the content of a document, the transmitter must keep the latter in electronic form. In order to be able to differentiate the two documents presented to a judge, a verification takes place of the signature of the transmitted document and that of the received document. The receiver may still pretend not to have received the document, but it is possible to assess the good faith of the transmitter if the receiver states that he has received it.

The receiving terminal must confirm the satisfactory reception of the document by returning an acknowledgement of receipt after checking the signatures of each document page. This acknowledgement is constituted by the signature of the content of the security page or security informations and an information byte containing possible reasons for refusal of reception of the document. This sequence of bytes is transmitted in the positive acknowledgement signal MCF of recommendation T30 of CCITT, whose extension is proposed by the present invention.

The confidentiality in the connection mode of a transmitted document is ensured by the encrypting of fax data. Encrypting is applied after encoding the document by algorithms recommended for faxing, so as not to destroy the effectiveness of the compression permitted by these algorithms.

Confidentiality outside the connection mode is ensured by a personal letterbox mechanism accessible to the user, provided that he presents his smart card and the associated confidential code.

We claim:

1. Device for rendering secure the transmission of faxes comprising a user interface and a security module, said security module being operable to generate and check a plurality of digital signatures, said digital signatures including an operator digital signature and a transmission date and time digital signature, said security module including means for authenticating the operator, means for verifying transmission and reception, and means for detecting replays, wherein said means for detecting replays is operable to compare the transmission date and time digital signature with a plurality of previously received transmission date and time digital signatures and rejects the fax being transmitted if said transmission date and time digital signature corresponds with any one of said plurality of previously received transmission date and time digital signatures.

2. Device according to claim 1, wherein the means for authenticating the operator comprises a smart card reader.

3. Device according to claim 1, further comprising an encrypting-decrypting module.

4. Fax or telecopy unit comprising a checking member, a communication module, a user interface, and a security module operable to generate and check a plurality of digital signatures, said digital signatures including an operator digital signature and a transmission date and time digital signature, said security module including means for detecting replays, means for verifying transmission and reception, and means for checking the integrity of transmitted information using said digital signatures, wherein said means for detecting replays is operable to compare the transmission date and time digital signature with a plurality of previously received transmission date and time digital signatures and rejects the fax being transmitted if said transmission date and time digital signature corresponds with any one of said plurality of previously received transmission date and time digital signatures.

5. Fax unit according to claim 4, wherein the means for authenticating the operator includes a smart card reader.

6. Fax unit according to claim 4, further comprising an encrypting-decrypting module.

7. Process for secured fax transmission of a document from a transmitting fax unit to a receiving fax unit, including a stage of preparing the transmitting fax unit comprising the steps of:

authenticating an operator and generating an operator digital signature, selecting a transmission mode, and analyzing, encoding, and preparing the document to be faxed;

transmitting the document from the transmitting fax unit to the receiving fax unit, comprising the steps of:

generating a transmission date and time digital signature, exchanging the characteristics of the transmitting and receiving fax units, transmitting the document to a receiving fax unit together with security information, said security information including the operator digital signature and the transmission date and time digital signature, comparing the transmission date and time digital signature with a plurality of previously received transmission date and time digital signatures, transmitting an acknowledgement of receipt from the receiving fax unit to the transmitting fax unit, checking and storing in the transmitting fax unit the acknowledgement of receipt received from the receiving fax unit.

8. Process according to claim 7, wherein the security information is transmitted in a security page separate from the document.

9. Process according to claim 7, comprising a further stage of consultation.

\* \* \* \* \*

UNITED STATES PATENT AND TRADEMARK OFFICE
CERTIFICATE OF CORRECTION

PATENT NO. : 5,555,307
DATED : September 10, 1996
INVENTOR(S) : Le Corre et al.

It is certified that error appears in the above-indentified patent and that said Letters Patent is hereby corrected as shown below:

Column 1, line 47, delete "," (comma); and
line 63, delete "storage of" and insert --storing--.

Column 2, line 56, delete "the said" and insert --an encrypting-decrypting--; and
line 56, delete "the" and insert --a--.

Column 3, line 27, after "(phase 24)" insert --.-- (period).

Signed and Sealed this

Third Day of June, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,555,307
DATED : September 10, 1996
INVENTOR(S) : Le Corre et al.

It is certified that error appears in the above-indentified patent and that said Letters Patent is hereby corrected as shown below:

On the title page:

Item [73], the following information should be added with respect to the second assignee: --La Poste, Boulogne Billancourt Cedex, France--.

Signed and Sealed this

Ninth Day of September, 1997

Attest:

BRUCE LEHMAN

Attesting Officer        Commissioner of Patents and Trademarks